US011261993B2

(12) United States Patent
Wendt

(10) Patent No.: US 11,261,993 B2
(45) Date of Patent: Mar. 1, 2022

(54) VALVE UPPER PART FOR SANITARY FITTINGS

(71) Applicant: Fluehs Drehtechnik GmbH, Luedenscheid (DE)

(72) Inventor: Joerg Wendt, Luedenscheid (DE)

(73) Assignee: Fluchs Drehtechnik GmbH, Luedenscheid (DE)

( * ) Notice: Subject to any disclaimer, the term of this patent is extended or adjusted under 35 U.S.C. 154(b) by 0 days.

(21) Appl. No.: 16/973,905

(22) PCT Filed: Dec. 13, 2019

(86) PCT No.: PCT/EP2019/085039
§ 371 (c)(1),
(2) Date: Dec. 10, 2020

(87) PCT Pub. No.: WO2020/164779
PCT Pub. Date: Aug. 20, 2020

(65) Prior Publication Data
US 2021/0262573 A1 Aug. 26, 2021

(30) Foreign Application Priority Data
Feb. 11, 2019 (EP) .................................... 19156517

(51) Int. Cl.
*F16K 31/60* (2006.01)
*F16K 11/078* (2006.01)
*F16K 3/02* (2006.01)

(52) U.S. Cl.
CPC .......... *F16K 31/605* (2013.01); *F16K 3/0218* (2013.01); *F16K 3/0254* (2013.01); *F16K 11/0782* (2013.01); *F16K 31/60* (2013.01)

(58) Field of Classification Search
CPC ...... F16K 3/0218; F16K 3/0254; F16K 31/60; F16K 31/605; F16K 11/0782; F16K 11/0785; F16K 11/0787; E03C 1/0412
See application file for complete search history.

(56) References Cited

U.S. PATENT DOCUMENTS

| 4,610,268 | A | * | 9/1986 | Knapp ...................... F16K 3/10 |
| | | | | 137/454.6 |
| 5,082,023 | A | | 1/1992 | D'Alayer de Costemore d'Arc |
| | | | | (Continued) |

FOREIGN PATENT DOCUMENTS

| DE | 32 07 895 C2 | 12/1983 |
| DE | 690 08 114 T2 | 7/1994 |
| | (Continued) | |

OTHER PUBLICATIONS

International Search Report in PCT/EP2019/085039, dated Feb. 7, 2020.

*Primary Examiner* — David Colon-Morales
(74) *Attorney, Agent, or Firm* — Collard & Roe, P.C.

(57) ABSTRACT

A valve upper part for inserting into a sanitary fitting includes a head piece, in which a spindle is pivotably mounted, which protrudes from the head piece at the first end of the spindle and engages with a control disk at the second end of the spindle using a pin, which control disk is in contact with a rotationally fixed passage disk, which has at least one through opening, a gripping part being arranged at the first end of the spindle. The gripping part is designed as a slide, which has a pivot space, which accommodates the first end of the spindle in every pivot position and in which a driver element is arranged, by means of which the spindle is connected to the slide.

14 Claims, 3 Drawing Sheets

(56) References Cited

U.S. PATENT DOCUMENTS

Figure 1:
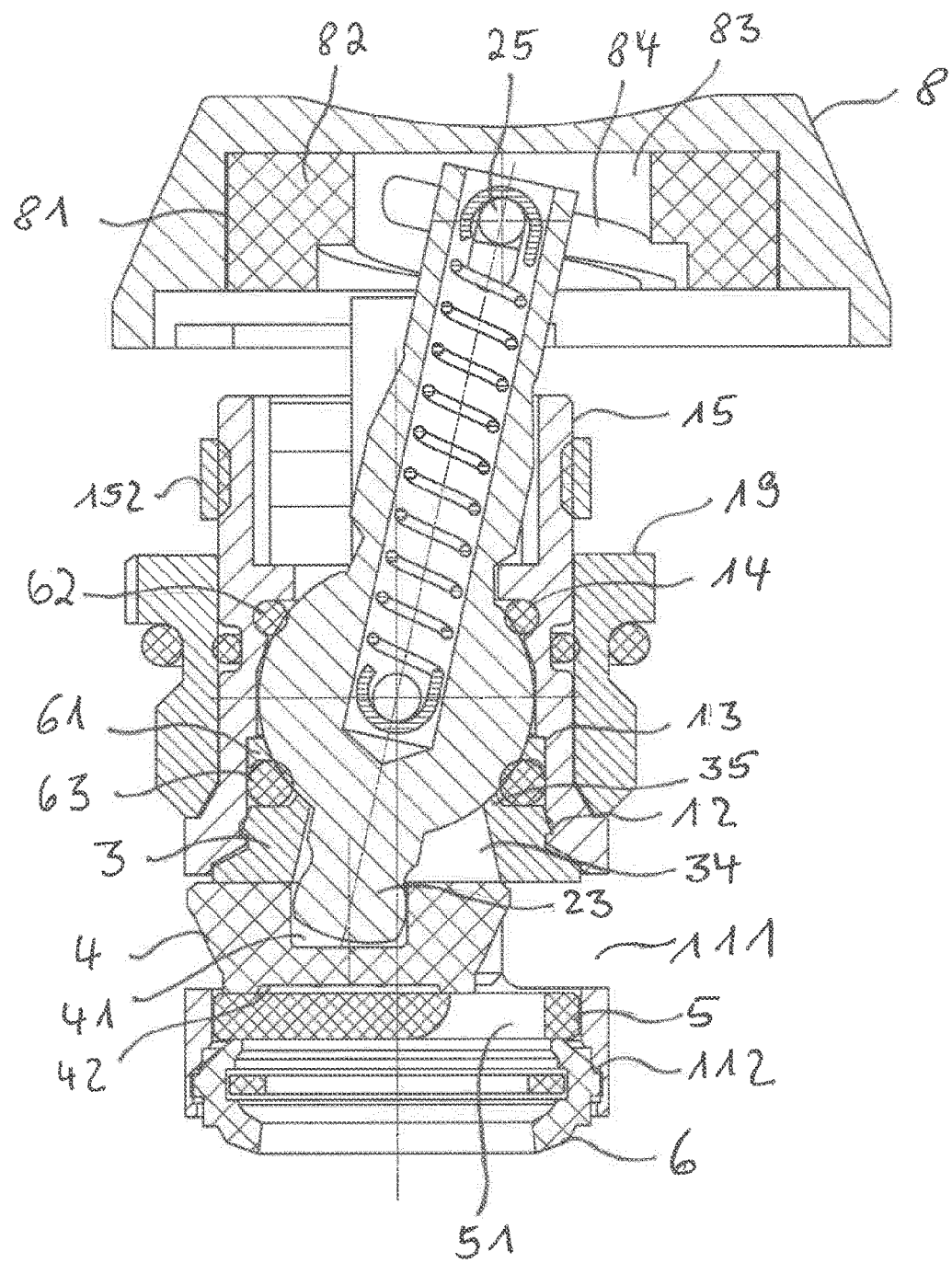

| | | | | |
|---|---|---|---|---|
| 5,095,934 A * | 3/1992 | Iqbal | ................... | F16K 11/0782 |
| | | | | 137/270 |
| 5,490,540 A * | 2/1996 | Vom Dahl | .......... | F16K 11/0782 |
| | | | | 137/625.17 |
| 7,861,742 B2 * | 1/2011 | Kim | ................... | F16K 11/0785 |
| | | | | 137/625.4 |
| 8,763,986 B2 * | 7/2014 | Leutwyler | ........... | F16K 11/0782 |
| | | | | 251/214 |
| 9,841,121 B2 * | 12/2017 | Ben-Dor | ............. | F16K 11/0787 |
| 2010/0212760 A1 * | 8/2010 | Kim | ................... | F16K 11/0787 |
| | | | | 137/605 |
| 2011/0000564 A1 * | 1/2011 | Corbin | ............... | F16K 11/0787 |
| | | | | 137/625.4 |
| 2016/0018011 A1 * | 1/2016 | Lange | .................. | F16K 27/045 |
| | | | | 137/625.44 |

FOREIGN PATENT DOCUMENTS

| | | | | |
|---|---|---|---|---|
| DE | 20 2011 103480 U1 | 10/2011 | | |
| EP | 0112777 A1 * | 7/1984 | .......... | F16K 11/0787 |
| EP | 0 426 587 A1 | 5/1991 | | |
| EP | 0426587 A1 * | 5/1991 | .......... | F16K 11/0787 |
| EP | 1462692 A1 * | 9/2004 | .......... | F16K 3/0218 |
| EP | 1 462 692 B1 | 11/2006 | | |
| WO | 2005/085691 A1 | 9/2005 | | |
| WO | WO-2005085691 A1 * | 9/2005 | ........... | F16K 31/605 |

* cited by examiner

VALVE UPPER PART FOR SANITARY FITTINGS

CROSS REFERENCE TO RELATED APPLICATIONS

This application is the National Stage of PCT/EP2019/085039 filed on Dec. 13, 2019, which claims priority under 35 U.S.C. § 119 of European Application No. 19156517.5 filed on Feb. 11, 2019, the disclosure of which is incorporated by reference. The international application under PCT article 21(2) was not published in English.

The invention relates to a valve upper part for introduction into a sanitary fitting, having a head piece in which a spindle is mounted so as to pivot, which spindle projects out of the head piece with its first end and stands in engagement, by way of a journal, with a control disk with its second end, which disk stands in contact with a locally fixed passage disk that has at least one through opening, wherein a gripping part is arranged on the first end of the spindle.

Exit of media from fittings, in particular of water from sanitary fittings, is controlled with the aid of valve upper parts. For this purpose, the valve upper part is positioned in the housing of a fitting by means of its head piece; a rotary handle or lever is set onto its spindle. In the case of known valve upper parts having a rotating spindle (cf. DE 32 07 895 C2), two disks are provided, in each instance, for controlling the through-flow. The disks are produced from a ceramic material. One of the two disks—control disk—is arranged in the valve upper part so as to rotate, with the aid of a driver that stands in connection with the spindle. The other disk—passage disk—is a fixed valve seat disk, also referred to as a fixed disk. When the control disk is rotated, the disks slide on one another. A seal is arranged on the side facing the valve seat of the fitting, which seal lies against the passage disk. The seal projects beyond the end face surface of the valve upper part. It serves for providing a seal not only for the passage disk but also toward the valve seat of the fitting.

Ceramic disks are also used in the case of single-lever mixing valves, to control the through-flow (cf. EP 1 462 692 B1). In the case of these valves, a spindle that is mounted so as to rotate and pivot is provided, with the aid of which control of the through-flow takes place. The spindle has a ball, with the aid of which the spindle can pivot in the head piece. Directly subsequently, the spindle has a further ball-shaped part, with which the spindle engages into a driver that stands in connection with the control disk. Control of exiting of water takes place here by means of pivoting the spindle, which is moved translationally relative to the locally fixed passage disk, by way of engagement into the control disk.

For pivoting the spindle, an arcuate movement of the handle connected with the spindle, about the pivot axis of the spindle, is required. So as to allow this movement, a sufficient length of the spindle is required, so that the handle is positioned at a sufficient distance from the fitting that holds the valve upper part. In many applications, an unobtrusive, compact arrangement of fitting and handle is desired. In this regard, positioning of the handle at a distance from the fitting is perceived as being optically disruptive.

This is where the invention seeks to provide a remedy. The invention is based on the task of making available a valve upper part having a handle that can be positioned directly on the fitting, with unrestricted functionality. According to the invention, this task is accomplished by means of the characteristics of the characterizing part of claim 1.

With the invention, a valve upper part is made available that allows positioning of the handle directly on the fitting, with unrestricted functionality. Because of the fact that the gripping part is configured as a slide that has a pivot space in which a driver is arranged, by way of which the spindle is connected with the slide, pivoting of the spindle is made possible by means of a merely translational movement of the gripping part, wherein the movement of the slide is transferred to the spindle by way of the driver. The arcuate movement of the first end of the spindle, about its pivot axis, which is brought about in this way, takes place within the pivot space of the slide. For this purpose, the pivot space is configured in such a manner that it accommodates the first end of the spindle in every pivot position. The gripping part, which is configured as a slide, is not involved in this arcuate movement of the first end of the spindle.

In a further development of the invention, the driver is formed by means of a driver axle that is guided through an oblong hole that extends in the axial direction of the spindle. In this way, sliding of the driver during a pivoting movement of the spindle within the oblong hole is made possible; a transfer of force between slide and spindle takes place exclusively in the translational movement direction of the slide. In the present case, a slot introduced into the spindle, which more or less represents an oblong hole that is open at the top, should also be subsumed in the term "oblong hole."

In an embodiment of the invention, the spindle is connected with the driver by way of a spring element. In this way, biasing of the slide against the spindle is achieved by way of the driver arranged in it, and thereby the slide is held on the displacement surface of the fitting. Preferably, the spring element is formed by way of a helical spring.

In a further embodiment of the invention, the spindle is connected with the head piece, so as to pivot, by way of an axle pin, wherein the axle pin is connected with the spring element. Preferably, the spring element is accommodated by a dead-end bore introduced axially into the spindle, through which bore the axle pin, which is connected with the spring element, penetrates in the transverse direction. In this way, integration of the spring element into the spindle is achieved, and thereby external impairment of the spring element due to contamination is prevented and a compact construction is achieved.

In a further development of the invention, the driver axle is held by a motion link of the slide, which link is preferably introduced into the wall that delimits the pivot space. In this regard, the driver axle can preferably be moved into the motion link and can be locked in place in a defined position. In this way, easy installation of the slide on the spindle is made possible. For this purpose, the driver axle is introduced into the motion link and brought into an undercut of the motion link by means of rotation of the slide, in which undercut the driver axle slides by means of the bias applied to it by the spring element, similar to a bayonet closure. In this way, the slide is firmly connected with the spindle.

In a further development of the invention, the spindle has a ball-shaped section on which the journal is arranged. In this regard, the spindle preferably lies on a disk guide with its ball-shaped section, in which guide the control disk is guided. Preferably, the spindle is mounted to float between two seal rings arranged at a distance from one another with its ball-shaped section, which rings are preferably configured as O-rings. In this way, cushioned mounting of the spindle is achieved, and thereby a good feel of the valve upper part is achieved.

In a further embodiment of the invention, the head piece has an elongated opening on its end face facing the spindle, through which opening the spindle passes and in which it is guided in the pivot direction.

In a further development of the invention, the head piece has a holder for an anchoring element on the outside, on its end facing the slide. In this way, easy fixation of a cover panel, for example of a glass panel on which the slide rests is made possible.

In an embodiment of the invention, the holder is formed by a groove or by an outside thread, wherein the anchoring element is preferably formed by a spring washer or by a nut.

Furthermore, a sanitary fitting having a valve seat into which at least one inflow channel and at least one outflow channel open and into which a valve upper part of the aforementioned type is introduced is an object of the invention, wherein a slide plate is provided, through which the spindle is guided and on which the slide of the valve upper part rests in displaceable manner. The slide plate can be formed from any type of material, preferably a smooth material, for example in the form of a glass panel.

In a further development of the invention, an inside thread is provided above the valve seat, into which thread a screw sleeve can be screwed to fix the valve upper part in place in the valve seat.

Figure 2:
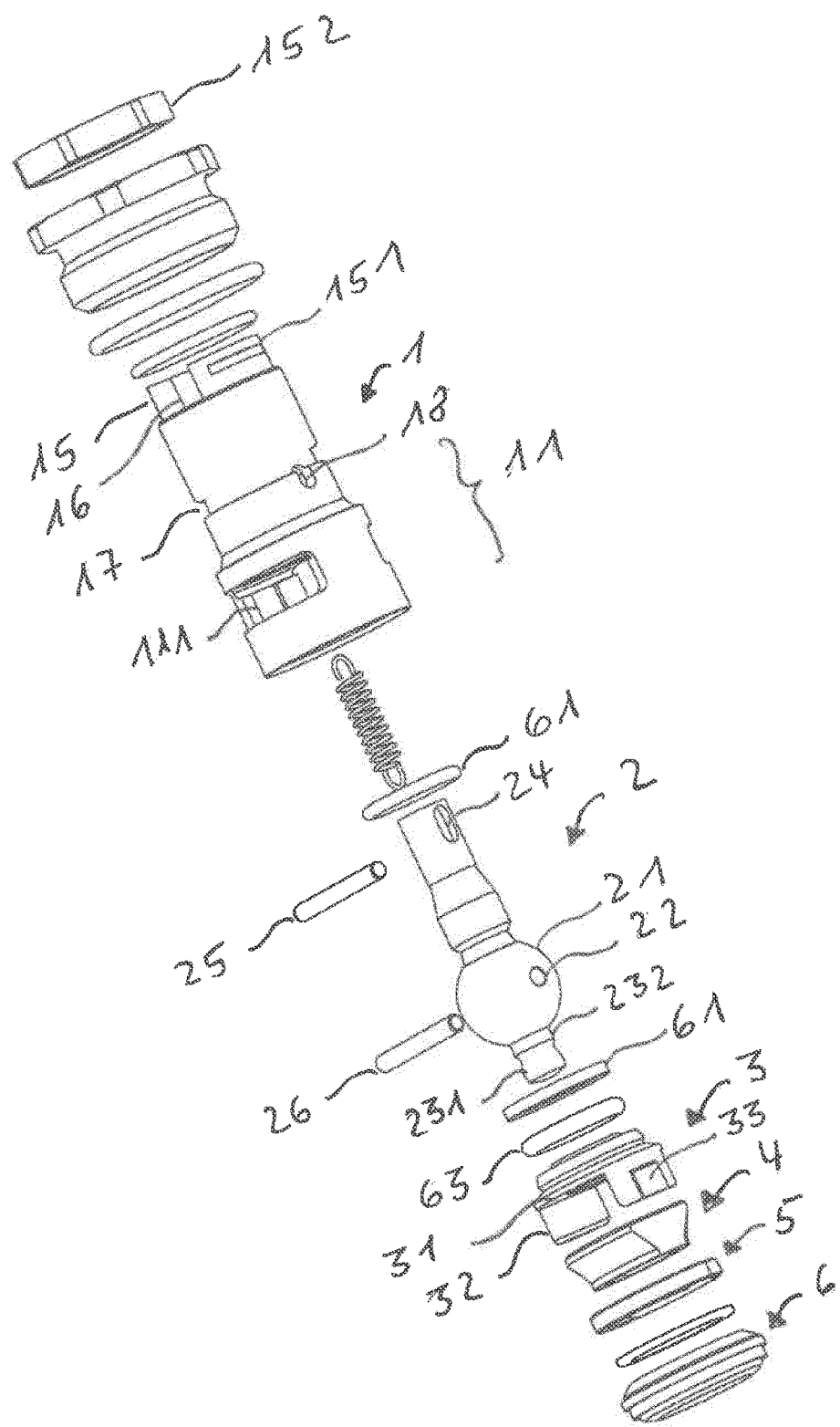
Figure 3:
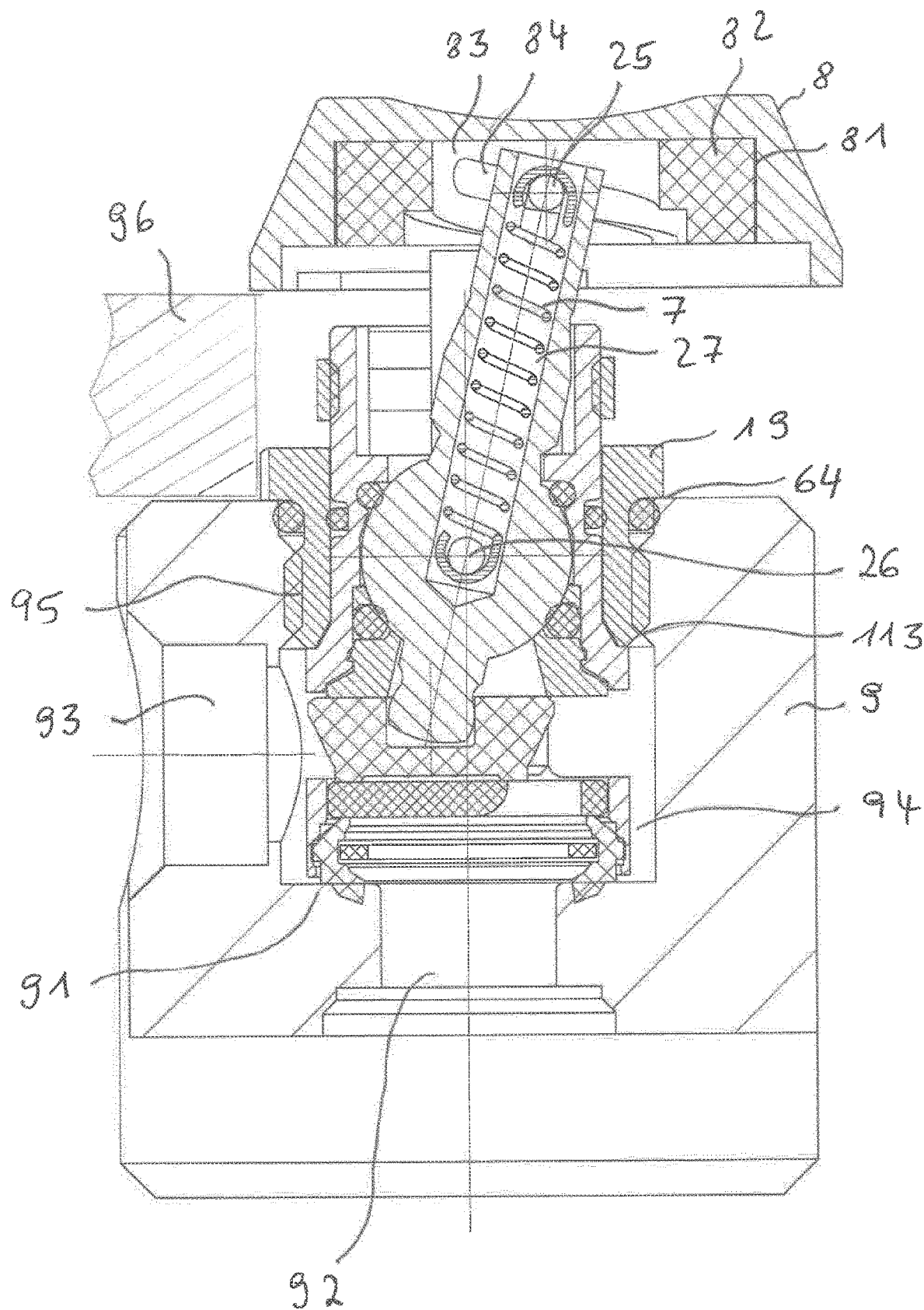

Other further developments and embodiments of the invention are indicated in the remaining dependent claims. An exemplary embodiment of the invention is shown in the drawings and will be described in detail below. The figures show:

FIG. 1 the schematic representation of a valve upper part in longitudinal section;

FIG. 2 the schematic representation of the valve upper part from FIG. 1 in an exploded representation (without slide), and FIG. 3 the schematic representation of a sanitary fitting with a mounted valve upper part according to FIG. 1.

The valve upper part selected as an exemplary embodiment has a head piece 1, through the center of which a spindle 2 guided radially in it passes. The spindle 2 is guided by way of a torque-proof disk guide 3 and stands in engagement with a control disk 4, which in turn is guided in the disk guide 3. The control disk 4 stands in contact with a passage disk 5, which is held in the head piece and stands in contact with a seal 6 on its side facing away from the control disk 4. The spindle 2 holds a helical spring 7, by way of which the spindle 2 is connected with a slide 8.

The head piece 1 consists of a symmetrical hollow body, the two end faces of which are open. On its side facing the fitting 9, the head piece 1 has a sleeve-like part 11, in which two passage windows 111 are introduced, diametrically opposite one another, which windows are delimited by longitudinal ridges. On the inside, a groove 112 for holding the seal 6 is introduced in the sleeve-like part 10, on the end side.

On its side facing away from the fitting 9, subsequent to the windows 111, a circumferential rest groove 12 for a rest connection of the disk guide 3 is arranged on the inside. In the further progression of the inside contour of the head piece 1, the inside diameter is set back and continued at a lesser diameter, thereby forming a step 13. The step 13 serves for contact of a holding ring 61, which, together with the disk guide 3, forms a holder for a second O-ring 63. The step 13 is followed by a diameter narrowing in the shape of a sphere section, which is delimited by a ring groove 14 for holding a first O-ring 62 and opens into a perpendicular bore that is followed by a guide section 15, which has an elongated opening 16. In the guide section 15, an outside thread 151 for holding an anchor nut 152 is introduced on the outside. Below the guide section 15, a circumferential groove 17 for holding a sealing ring 64 for providing a seal with regard to the fitting 9 is introduced in the head piece 1, on the outside. At a distance from the circumferential groove 17, furthermore two vertical oblong hole bores 18 that lie diametrically opposite one another are introduced into the head piece 1, to hold the axle pin 26 that is guided through the bore 22 of the ball-shaped section 21 of the spindle 2.

The spindle is configured in essentially cylindrical manner and has a ball-shaped formed-on part 21 at one end, in which part a bore 22 for holding an axle pin 26 is introduced, orthogonal to the axis of rotation of the spindle 2. On its side facing the disk guide 3, a journal 23 is screwed into the ball-shaped section 21, coaxial to the axis of rotation of the spindle 2, which journal has a barrel-shaped driver section 231 on the end side, which section is followed by a cylindrical section 232, which lies against the ball-shaped section 21. On its end that lies opposite the journal 23, an oblong hole bore 24 for holding the driver axle 25 is introduced into the spindle 2, orthogonal to its axis of rotation. In the center, the spindle 2 is provided with a dead-end bore 27 that runs along its axis of rotation, which bore opens into the ball-shaped section 21 above the journal 23 and through which the bore 22 as well as the oblong hole bore 24 pass. The dead-end bore 27 serves for holding the helical spring 7, which is held, on the end side, by the axle pin 26 on the one side and by the driver axle 25 on the other side.

The spindle 2 is mounted to float between the first O-ring 62 and the second O-ring 63 in the head piece 1, with its ball-shaped formed-on part 21, and penetrates the elongated opening 16 of the guide section 15.

The disk guide 3 is configured essentially in cylindrical manner. On its side facing away from the ball-shaped section 21 of the spindle 2, a planar guide surface 31 is arranged, which is delimited by two guide ridges 32 that lie diametrically opposite one another. The guide ridges 32 are provided with two guide projections 33 on the outside, which engage—in a manner not shown—into guide grooves on the inside of the sleeve-like part 11 of the head piece 1, which run from the groove 112 all the way to the upper edge of the passage windows 111. By means of the engagement of the guide projections 33 into the guide grooves of the head piece, torque-proof securing of the guide disk 3 within the head piece 1 is brought about.

A spindle guide 34 in the form of an oblong hole is introduced into the center of the disk guide 3, the longitudinal axis of which hole runs parallel to the guide ridges 32 and passes through the journals 23 connected with the spindle 2. The length of the oblong hole of the spindle guide 34 increases along the axis of rotation of the cylindrical base body in the direction of the guide surfaces 31; consequently, the spindle guide 34 is configured essentially in conical shape. On its end facing away from the guide surfaces 31, the spindle guide 34 is provided circumferentially with a ball holder 35, which is configured in the manner of a chamfer.

The control disk 4 is arranged between the guide ridges 32 of the disk guide 3, lying against the guide surface 31. This disk has an essentially elliptical outer contour, which is shortened orthogonal to the longitudinal center axis at its longitudinal ends, and thereby two side surfaces that are parallel to one another are formed, which lie against the guide ridges 32 of the disk guide 3.

In the center, a dead-end bore 41 is introduced into the control disk 4, the diameter of which bore is slightly greater than the diameter of the end of the driver section 231 of the journal 23 of the spindle 2, which end is shaped as a ball-shaped section. In the assembled state, the driver section 231 engages into the dead-end bore 41. On the side of the control disk 4 that lies opposite the dead-end bore 41, a depression 42 is introduced, which essentially has a shape that corresponds to the outer contour of the control disk 4.

The passage disk 5 is configured essentially as a circular, round disk. It has two guide projections—not shown—on its circumference, which lie diametrically opposite one another and engage into corresponding guide grooves of the sleeve-shaped part 11 of the head piece 1. Thereby the passage disk 5 is held in the head piece 1 in torque-proof manner. A through opening 51 is introduced into the passage disk 5, which opening has an approximately sickle-shaped contour. If the spindle 2, with the journal 23 attached to it, is pivoted within the spindle guide 34, the control disk 4 is moved radially on the passage disk 5, and thereby the through opening 51 of the passage disk 5 is exposed or closed off.

The head piece 1 is inserted into the valve seat 91 of the fitting 9, wherein the head piece 1 is sealed off with regard to the inflow channel 92 of the fitting 9 by way of the seal 6. In this regard, the passage windows 111 of the sleeve-like part 11 of the head piece 1 are positioned in a chamber 94 of the fitting 9, into which chamber an outflow channel 93 opens. Above the chamber 94, the fitting has an inside thread 95 into which a screw sleeve 19 is screwed, by way of which the head piece 1 is fixed in place in the fitting 9. In this regard, the screw sleeve 19 lies on a step 113 formed circumferentially on the sleeve-like part 11 of the head piece 1, above the passage windows 111. Above the inside thread 95, the screw sleeve 19 is sealed with regard to the fitting 9 by way of a seal ring 64. A glass pane 96—merely indicated in FIG. 3—is attached to the fitting 9, on which pane the slide 8 of the valve upper part lies. The glass pane 96 is fixed in place on the fitting 9 by way of an anchor nut 152, which is screwed onto the outside thread 151 of the guide section 15 of the head piece 1.

The slide 8 has an essentially cylindrical recess 81 on its underside facing the fitting 9, into which recess a motion link insert 82 is inserted. The motion link insert 82 has a pivot space 83, essentially in the form of a hollow cylinder, into the mantle surface of which a motion link guide 84 is introduced, into which the driver axle 25 can be moved and engaged into an undercut of the motion link guide 84. The pivot space 83 of the motion link insert 82 is dimensioned in such a manner that the end of the spindle 2 held by it can be freely moved by way of the pivot movement of the spindle.

The slide 8 is biased against the glass pane 96 arranged on the fitting 9 by way of the driver axle 25 held by the motion link insert 82, which axle is connected with the axle pin 86 of the spindle 2 by way of the helical spring 7. To activate the valve upper part, the slide 8 is displaced along the glass pane 96. This displacement movement is transferred to the spindle 2 by way of the driver axle 25, and the spindle is thereby pivoted about the axle pin 26. In this regard, the end of the spindle 2 situated in the pivot space 83 of the slide 8 runs along an arc, but without coming into contact with a wall of the slide 8. In this regard, the driver axle 25 migrates within the oblong hole bore 24 of the spindle 2.

The invention claimed is:

1. A valve upper part for introduction into a sanitary fitting, having a head piece in which a spindle is mounted so as to pivot, which spindle projects out of the head piece with its first end and stands in engagement, by way of a journal, with a control disk with its second end, which disk stands in contact with a locally fixed passage disk that has at least one through opening, wherein a gripping part is arranged on the first end of the spindle, wherein the gripping part is configured as a slide that has a pivot space that holds the first end of the spindle and in which a driver is arranged, by way of which the spindle is connected with the slide
wherein the driver is formed by means of a driver axle that is guided through an oblong hole that extends in the axial direction of the spindle.

2. The valve upper part according to claim 1, wherein the driver axle is held by a motion link of the slide.

3. The valve upper part according to claim 2, wherein the driver axle can be moved into the motion link and locked in place in a defined position.

4. The valve upper part according to claim 1, wherein the spindle has a ball-shaped section on which the journal is arranged.

5. The valve upper part according to claim 3, wherein the spindle lies on a disk guide with its ball-shaped section, in which guide the control disk is guided.

6. The valve upper part according to claim 4, wherein the spindle is mounted to float between two seal rings arranged at a distance from one another, with its ball-shaped section.

7. The valve upper part according to claim 1, wherein the head piece has an elongated opening on its end face facing the spindle, through which opening the spindle passes and in which it is guided in a pivot direction.

8. The valve upper part according to claim 1, wherein the head piece has a holder for an anchoring element on its end facing the slide.

9. The valve upper part according to claim 8, wherein the holder is formed by a groove or by an outside thread, wherein the anchoring element is a spring washer or an anchor nut.

10. The sanitary fitting having a valve seat, into which at least one inflow channel and at least one outflow channel open and into which the valve upper part according to claim 1 is introduced, wherein a slide plate is arranged, through which the spindle is guided and on which the slide of the valve upper part lies in displaceable manner.

11. The sanitary fitting according to claim 10, wherein it has an inside thread for holding a screw sleeve for fixation of the valve upper part.

12. A valve upper part for introduction into a sanitary fitting, having a head piece in which a spindle is mounted so as to pivot, which spindle projects out of the head piece with its first end and stands in engagement, by way of a journal, with a control disk with its second end, which disk stands in contact with a locally fixed passage disk that has at least one through opening,
wherein a gripping part is arranged on the first end of the spindle, wherein the gripping part is configured as a slide that has a pivot space that holds the first end of the spindle and in which a driver is arranged, by way of which the spindle is connected with the slide,
wherein the spindle is connected with the driver by way of a spring element, and
wherein the spindle is connected with the head piece so as to pivot, by way of an axle pin, wherein the axle pin is connected with the spring element.

13. The valve upper part according to claim 12, wherein the spring element is a helical spring.

14. The valve upper part according to claim 12, wherein the spring element is held by a dead-end bore introduced axially into the spindle, which bore is penetrated, in the transverse direction, by the axle pin that is connected with the spring element.

* * * * *